(12) United States Patent
Collins et al.

(10) Patent No.: US 7,227,864 B2
(45) Date of Patent: Jun. 5, 2007

(54) METHODS AND SYSTEMS FOR ESTABLISHING COMMUNICATIONS THROUGH FIREWALLS AND NETWORK ADDRESS TRANSLATORS

(75) Inventors: Leonard Alan Collins, Carnation, WA (US); Kristofer Noel Iverson, Issaquah, WA (US); Lon-Chan Chu, Bellevue, WA (US); Yikang Xu, Bellevue, WA (US); Xin Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

(21) Appl. No.: 10/024,090

(22) Filed: Dec. 17, 2001

(65) Prior Publication Data

US 2003/0112823 A1 Jun. 19, 2003

(51) Int. Cl.
*H04L 12/56* (2006.01)
(52) U.S. Cl. .................. 370/392; 370/428
(58) Field of Classification Search ............ 370/410, 370/475, 400; 713/201, 153; 726/11–12
See application file for complete search history.

(56) References Cited

U.S. PATENT DOCUMENTS

| 6,018,619 | A | | 1/2000 | Allard et al. |
| 6,128,298 | A | * | 10/2000 | Wootton et al. ............ 370/392 |
| 6,182,228 | B1 | | 1/2001 | Boden et al. |
| 6,266,707 | B1 | | 7/2001 | Boden et al. |
| 6,301,669 | B2 | | 10/2001 | Boden et al. |
| 6,330,562 | B1 | | 12/2001 | Boden et al. |
| 6,484,257 | B1 | * | 11/2002 | Ellis ............................ 713/153 |
| H2065 | H | * | 5/2003 | Hong et al. .................. 709/226 |
| 6,615,357 | B1 | | 9/2003 | Boden et al. |
| 2002/0184533 | A1 | * | 12/2002 | Fox ............................ 713/201 |
| 2003/0018912 | A1 | * | 1/2003 | Boyle et al. ................. 713/201 |

OTHER PUBLICATIONS

Fred Langa, Senior Consulting Editor Windows Magazine , 1999 , n 1006A , PG54 Publication Date: 990615.*
The Internet Protocol Journal, Dec. 2000, vol. 3, No. 4.*

* cited by examiner

*Primary Examiner*—Hassan Kizou
*Assistant Examiner*—Salman Ahmed

(57) ABSTRACT

Disclosed are methods that enable communications to be established regardless of the presence of communications blockers, e.g., firewalls and NATs, in the path between two computing devices. Two devices each establish communications with a rendezvous service. Through the service, the devices signal each other to set up direct, peer-to-peer communications between themselves. If the devices fail to establish direct communications, then they invoke a relay service that provides the illusion of direct communications. In another aspect, an originating device attempts to establish communications with a recipient, using an address and port number associated with the recipient. If that attempts fails, possibly because a firewall is blocking communications, then the originating device retries using a port normally held open by firewalls. If this attempt also fails, then the originating device invokes the services of a proxy to negotiate a port acceptable for use by the recipient and by any intervening firewalls.

34 Claims, 16 Drawing Sheets

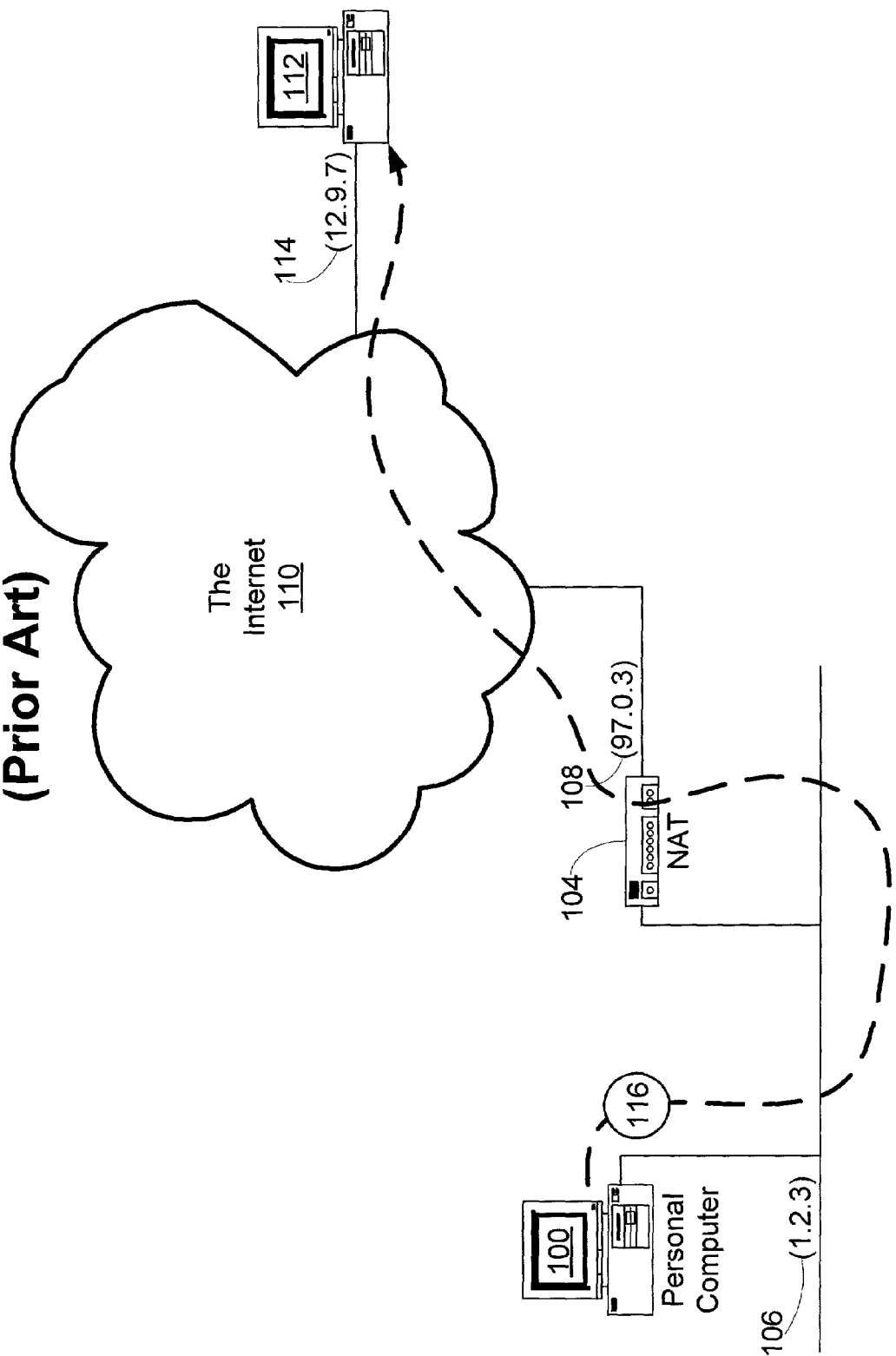

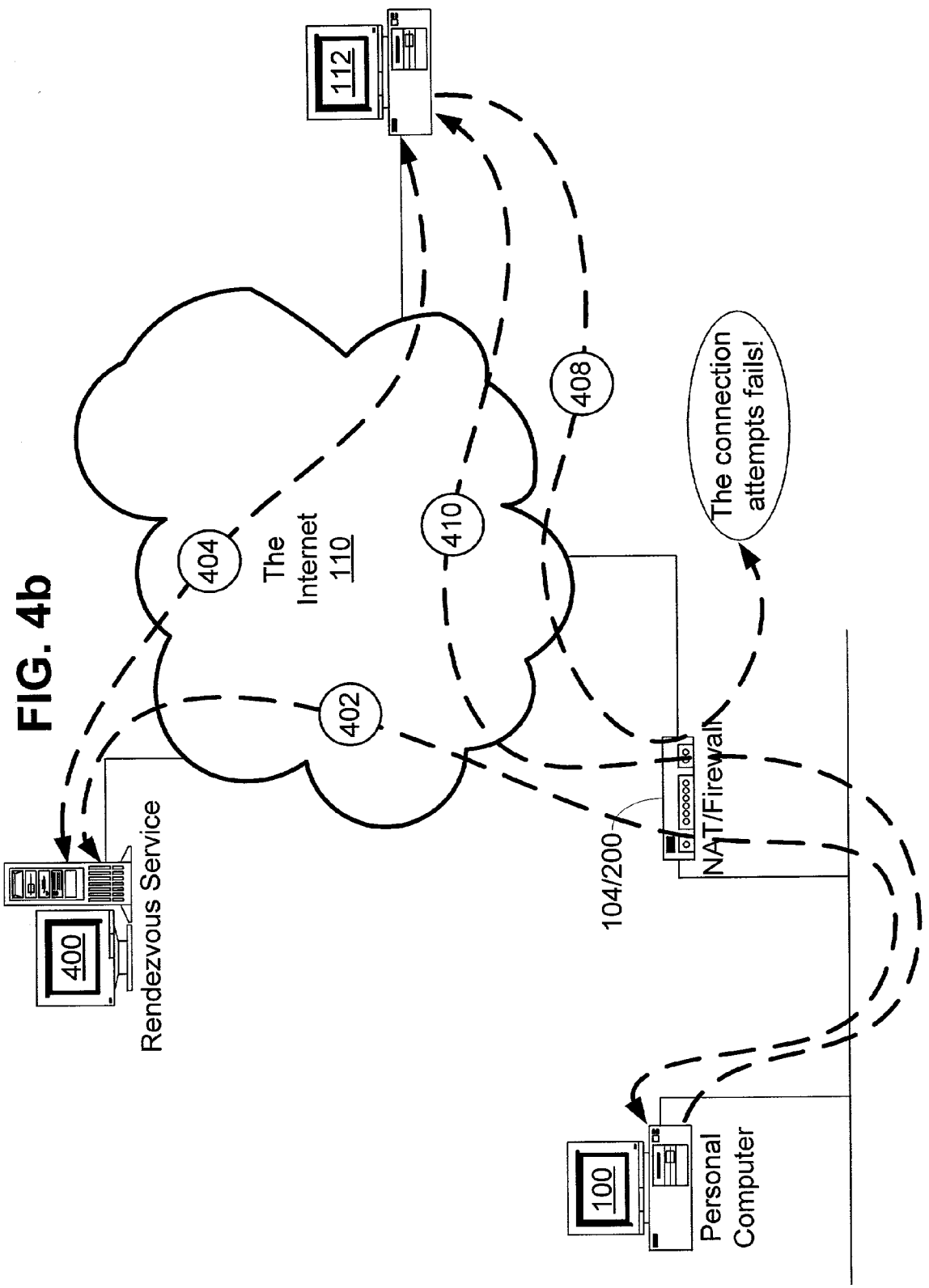

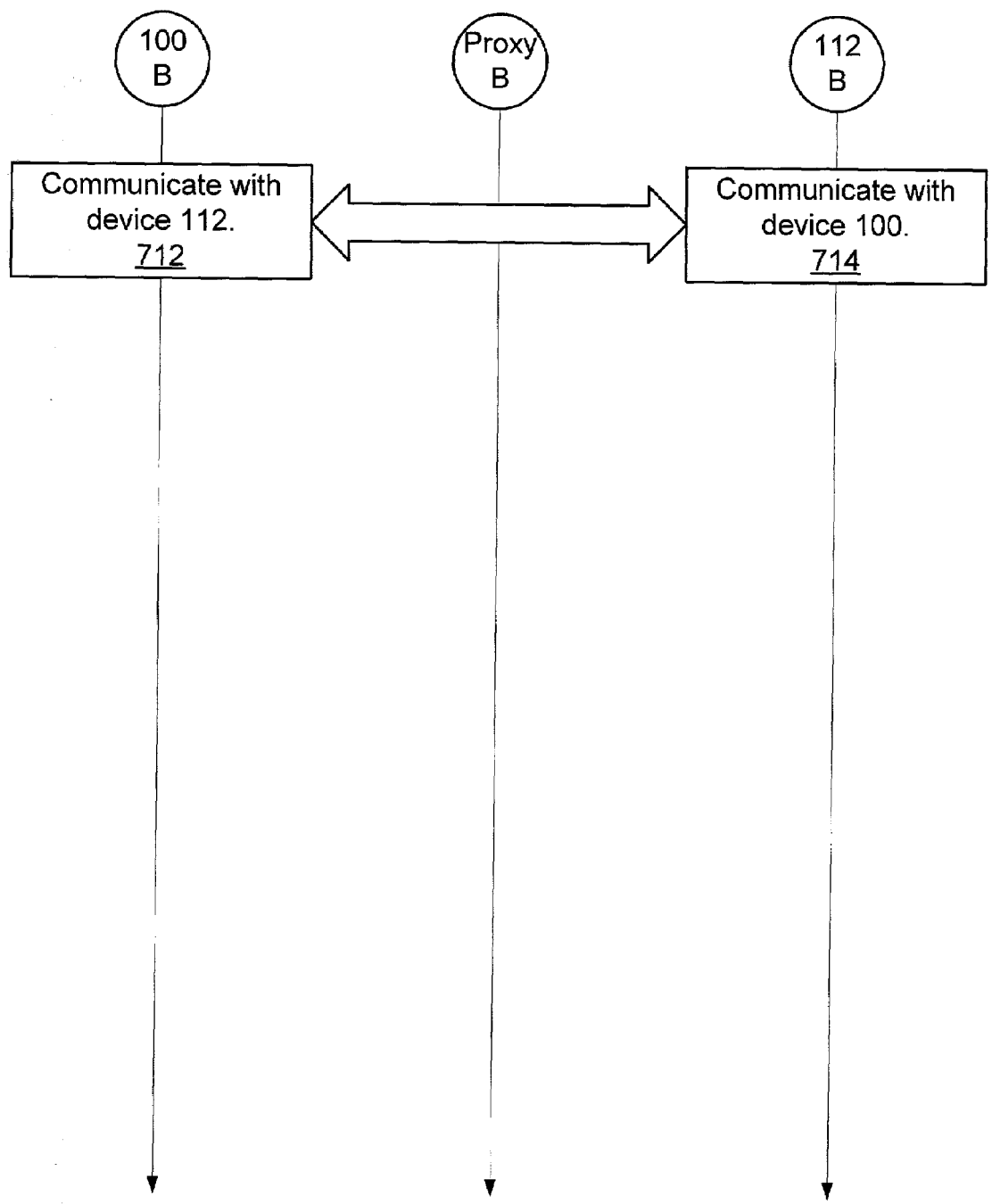

METHODS AND SYSTEMS FOR ESTABLISHING COMMUNICATIONS THROUGH FIREWALLS AND NETWORK ADDRESS TRANSLATORS

TECHNICAL FIELD

The present invention relates generally to computer communications, and, more particularly, to communications flowing through a firewall or a Network Address Translator.

BACKGROUND OF THE INVENTION

The growth of networks, specifically the Internet, is spurring a proliferation of applications based on peer-to-peer computer communications. In the older host-sever paradigm, a user took advantage of services provided by a more or less centralized corporate entity. In peer-to-peer communications, a user at one computing device communicates in real time directly with a user at another device. Computer telephony, teleconferencing, interactive games, and remote collaboration are just a few examples of increasingly popular applications that take advantage of inexpensive peer-to-peer communications.

It has long been possible to provide the illusion of peer-to-peer communications by means of a relay service. When two users wish to communicate, each logs on to the relay service and directs its communications to the relay service. The relay service receives the communications and forwards them on to their intended recipient. This approach is very useful as long as the amount of data transferred is small and the latency requirements are lax, but in cases that demand large bandwidth and real-time response, the relay service quickly becomes a traffic bottleneck. In addition, setting up and running a large relay service are quite expensive in terms of money and resources. Ideally, peer-to-peer applications can operate without the mediation of a relay service, but relays are still useful in providing connectivity when, for some reason, direct peer-to-peer communications are not possible.

Direct communications may not be possible if a "communications blocker" sits on the path between the peer computing devices. A firewall is a first example of a communications blocker. For security's sake, many users install firewalls between their computing devices and communications networks. Most firewalls protect computing devices by blocking incoming and outgoing communications except that which comes over specifically allowed addresses and ports. (Modern communications protocols, such as the Internet Protocol (IP), allow for the specification of source and destination fields called "ports," in association with the source and destination addresses. Ports are often used to differentiate messages intended for separate processes running on a single computing device.) If a peer-to-peer application attempts to reach a computing device behind a firewall, the firewall may prevent communications from ever reaching the device. Even for communications directed to an open port on the firewall (e.g., port 80 is usually open), the port may be handling so much traffic from other sources that real-time response requirements cannot be met.

Another potential blocker of peer-to-peer communications is the Network Address Translator (NAT). Ideally, each computing device connected to the Internet is assigned a unique network address within the public address space. The growth of Internet connectivity, however, has rapidly depleted the supply of public addresses. To compensate, many computing devices today do not have public addresses but are, rather, assigned private addresses outside the public address space. Having disparate address spaces leads to complications, however. For example, a device with a private address cannot send a message to a device with a public address unless the private address is first translated to some public address. NATs automatically perform this translation by intercepting packets from the device with the private address and then replacing the device's private address in the packet header with the NAT's own public address. The packet is then sent along to the outside device with the public address. The NAT stores a mapping between the private address of the device behind the NAT and the public address of the device outside the NAT. When communications arrives from the outside device addressed to the public address of the NAT, the NAT refers to this mapping and replaces its own public address in the packet header with the private address of the device behind the NAT. By way of this mapping, the device behind the NAT can both send communications to and receive communications from a device in the public address space.

The NAT translation scheme is based on the premise that communications are initiated by the computing device behind the NAT. The NAT must first set up the translation mapping before it can know how to handle communications coming from the public network address space. Were a device in the public address space to attempt to initiate peer-to-peer communications by sending a message to the public address of the NAT, then, upon receiving the message, the NAT would search for a translation mapping for the sender's public address but would not find one. The NAT would discard the message, and the communications would fail. This problem is compounded when each device is behind its own NAT. In this case, neither device can initiate communications: while the NAT of the communications initiator sets up its translation mapping, the NAT of the recipient does not have an appropriate mapping and discards the incoming message. Communications never start. As NATs proliferate, this shortcoming impedes the spread of any application based on direct peer-to-peer communications.

Note that in the context of this application, "firewall" and "NAT" refer to services, not necessarily to specific devices. These services may be provided on separate hardware boxes, may be combined into one box, and may even be instantiated as software running on the computing device itself.

A known approach to the problem of NATs sets up a signaling exchange between a computing device behind a NAT and the NAT. (The discussion of the current paragraph applies as well to firewalls as it does to NATs, but only NATs are discussed to avoid repetition or having to repeatedly write "NAT/firewall.") The device sends a message directly to the NAT. The message directs the NAT to allow the communications channel needed for a peer-to-peer application. However, this approach has its drawbacks. First, it forces the device to discover its NAT and to take the NAT's presence into account. Traditionally, devices did not need to know whether they sat behind a NAT: the NAT's operation was completely transparent. Second, because NATs operate automatically by intercepting communications and then discarding them or passing them along, no standard protocol exists to facilitate the signaling exchange. Adding that capability greatly alters the architecture of a NAT, which has often been an uncomplicated, firmware-based device. These considerations are compounded if the device sits behind a chain of multiple NATs or firewalls, some of which may be located far from it, such as at the facilities of the device's Internet Service Provider (ISP). The device may not be aware of all of these NATs and firewalls and may not have any means or permissions to communicate directly with them.

What is needed is a method for establishing communications that operates transparently to any communications blockers, e.g., firewalls, NATs, or what have you, in the communications path between peer computing devices.

SUMMARY OF THE INVENTION

The above problems and shortcomings, and others, are addressed by the present invention, which can be understood by referring to the specification, drawings, and claims. According to a first aspect of the present invention, two computing devices each establish communications with a rendezvous service. Each device can communicate with the rendezvous service regardless of the presence of communications blockers, such as firewalls or NATs, in the communications path between the device and the service. Through the rendezvous service, the two computing devices signal each other and coordinate their activities in setting up direct, peer-to-peer communications between the two devices. The signaling mechanism through the rendezvous service allows either computing device to attempt to establish communications. If both devices fail to establish direct, peer-to-peer communications, then they invoke the services of a relay service that provides the illusion of direct communications.

According to another aspect of the invention, usable separately or in conjunction with the first aspect, an originating computing device attempts to establish communications with a recipient computing device. The originating device uses an address and port number associated with the recipient computing device. If that attempts fails, possibly because a firewall is blocking communications, then the originating device retries using a port normally held open by firewalls. If this attempt also fails, then the originating device invokes the services of a proxy to negotiate a port acceptable for use by the recipient device and by any intervening firewalls.

The present invention, through its diverse aspects, enables communications to be established regardless of the presence of communications blockers in the path between two computing devices.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1b is a network flow diagram from the prior art showing the computing device behind the NAT of FIG. 1a initiating communications with the computing device outside the NAT;

FIGS. 4a, 4b, and 4c are network flow diagrams of scenarios in which two computing devices attempt to establish peer-to-peer communications with the aid of a rendezvous service;

FIGS. 7a, 7b, and 7c are a combination flow chart and data flow diagram of an exemplary method for a computing device to use in the scenario of FIG. 6.

DETAILED DESCRIPTION OF THE INVENTION

Figure 1A:
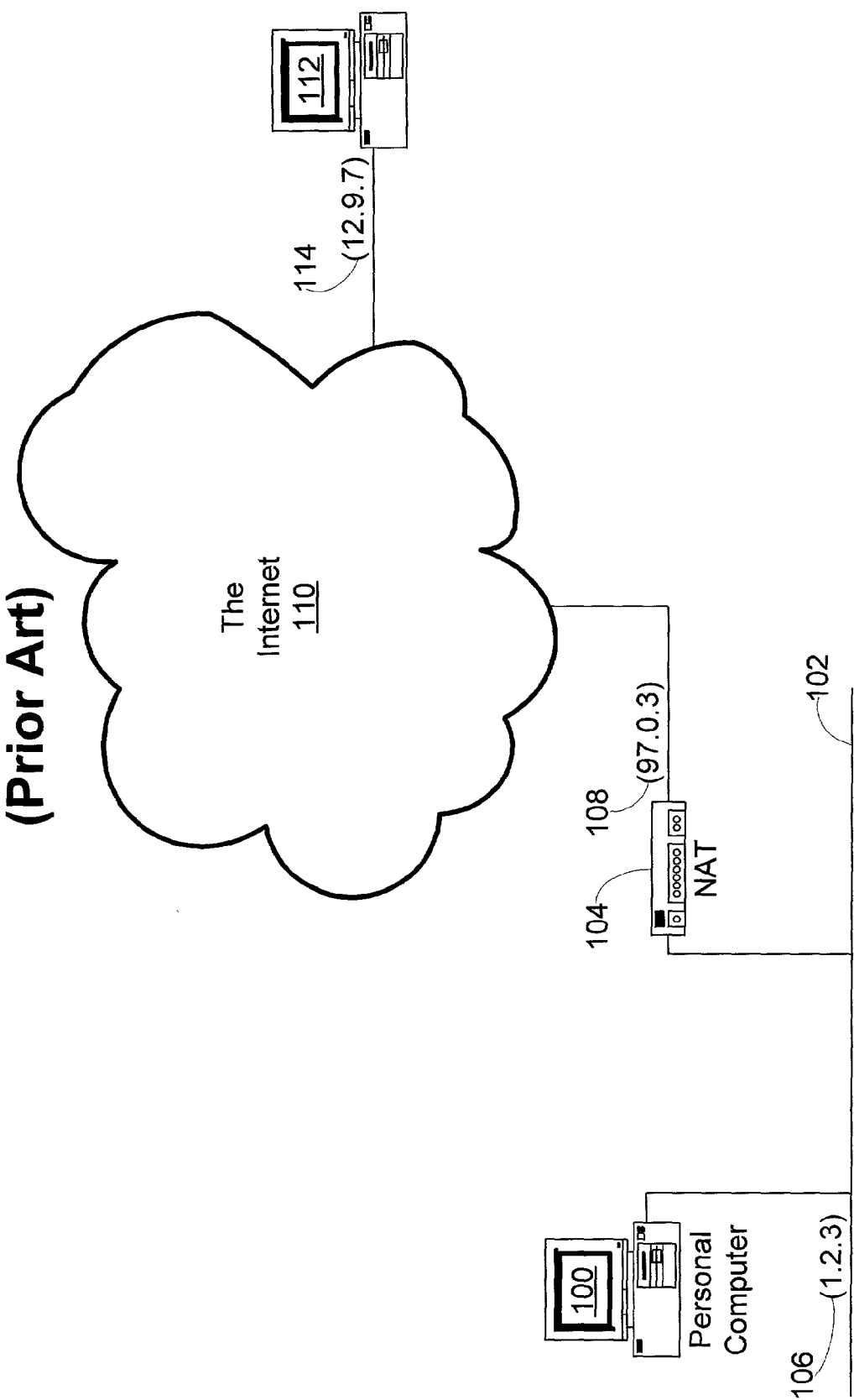
FIG. 1a is a network schematic from the prior art showing one computing device behind a NAT and another computing device outside the NAT.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein. Section I presents devices that often stymie attempts to establish direct, peer-to-peer communications between two computing devices. Section II presents an exemplary computing environment in which the invention may run. Section III describes exemplary embodiments of the invention's methods.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

I. Communications Blockers: NATs and Firewalls

Although the present invention does not involve changes to NAT or firewall functionality, it is important to understand those functionalities in order to understand the invention. FIG. 1a shows a prior art networking arrangement that is the basis for the following discussion of NATs and of the invention. In the Figure, a computing device 100 is connected via a local area network (LAN) 102 to a NAT 104. The NAT also has a connection to a public address space, here represented by the Internet 110. The network address 106 used on the LAN is a private address, that is to say, it is not valid in the public address space beyond the NAT. Because of this, device 100 cannot communicate with a computing device 112 in the public address space unless the private address 106 of device 100 is first translated. The NAT is responsible for this translation, and the mechanism of translation is described below with respect to FIG. 1*b*. Unlike the first device 100, device 112 has a public network address 114 that needs no translation. Note that while IP addresses are a standard for the industry, the example addresses (106, 108, and 114) are intentionally shown in a non-IP format to indicate that the invention is not limited to any particular addressing format.

Figure 1C:
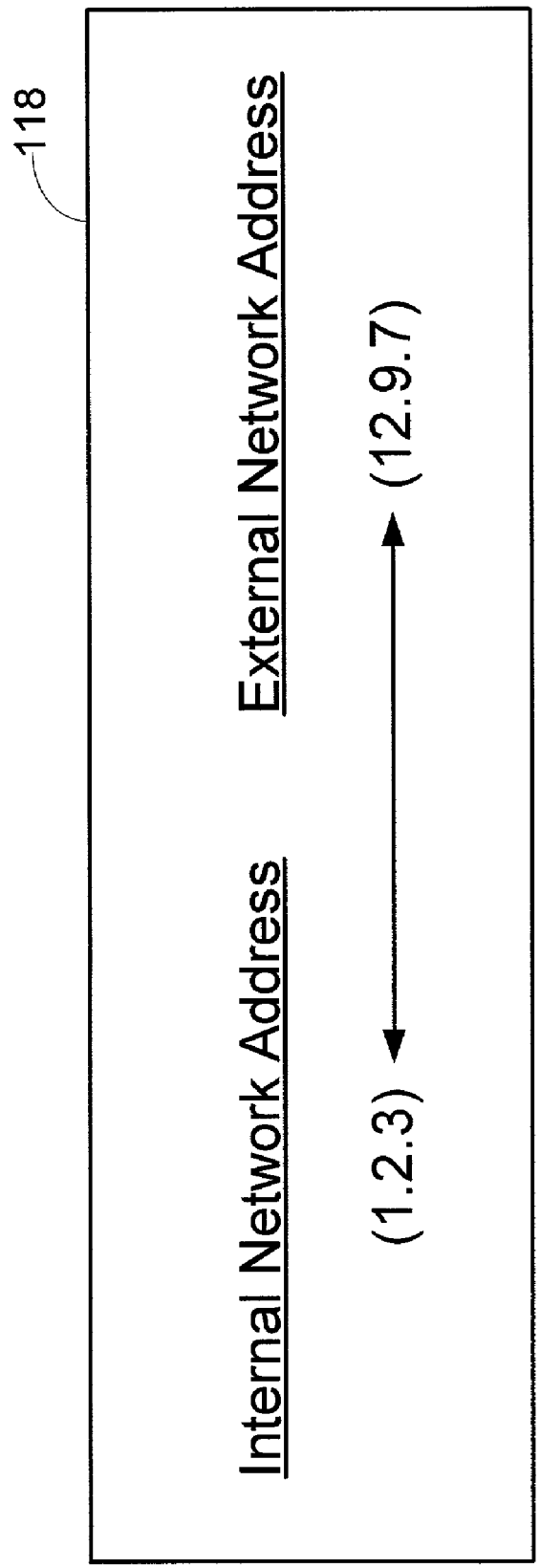
FIG. 1c is a data table diagram from the prior art showing the NAT's translation mapping that facilitates the communications of FIG. 1b.

FIG. 1*b*, also from the prior art, shows how NAT 104 facilitates computing device 100 in setting up communications with the computing device 112. Device 100 addresses an initial message to the public network address 114 of device 112. The initial message follows the path 116. Although the message is not addressed to the NAT, the NAT intercepts it and reads the "to address" field in the message's header. Because that field contains public network address 114, the NAT knows to send the message out on its connection to the Internet 110. However, the message as written by device 100 is not valid for the public address space because the "from address" field in the message's header contains the private network address 106 of device 100. The NAT replaces this private address with its own public address 108. The NAT also creates an address translation mapping that correlates the private network address 106 of device 100 with the public network address 114 of device 112. FIG. 1*c* shows this mapping in the translation table 118. Then, the NAT sends the altered initial message on its way. The initial message travels via the Internet 110 and is received by the destination device 112.

The message path 116 has an arrowhead at one end to indicate that it is the path for initiating communications between computing devices 100 and 112. That same path is traversed in the opposite direction by a response sent from device 112 to device 100 (although the exact path through the Internet 110 is immaterial). Device 112 addresses its response to the "from address" found in the header of the message it received. Because of the NAT's earlier translation, that address is actually the NAT's public address 108. When the NAT receives the response message, it searches its translation table 118 for the message's "from address" in the column pertaining to the interface over which the NAT received the message. The response message comes over the NAT's external network connection. In the "External Network Address" column of table 118 is an entry corresponding to the "from address" in the response message. Having found the appropriate address translation entry, the NAT removes its own external network address from the "to address" field of the message's header and substitutes for it the internal network address indicated by the mapping. In this case, that is (1.2.3), the address of device 100. In this manner, the NAT's address translation allows devices 100 and 112 to communicate with each other.

Computing devices 100 and 112 can communicate as long as the translation entry exists in the NAT's address translation table 118. For the sake of security and to preserve memory resources, the NAT does not store the translation mapping forever. Some NATs remove the translation after a period of inactivity. This timeout period may depend upon the type of the communications and is typically on the order of hours for Transmission Control Protocol (TCP) communications and minutes or seconds for User Datagram Protocol (UDP) communications. Other NATs may monitor the communications flow and discard the translation when one side or the other indicates that the conversation is over.

Figure 1D:
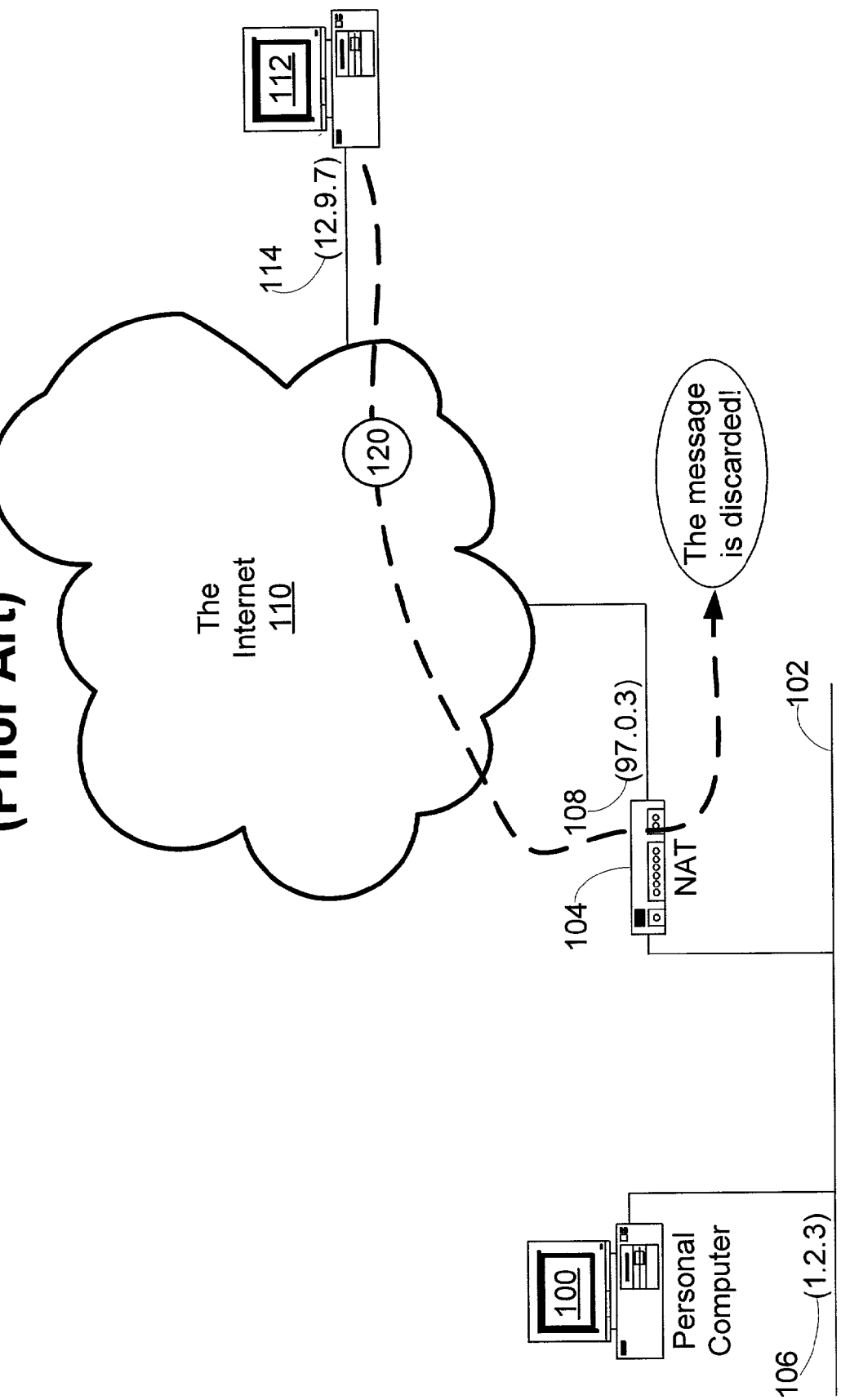
FIG. 1d is a network flow diagram from the prior art showing that the computing device outside the NAT of FIG. 1a cannot initiate communications with the computing device behind the NAT.

Note that the success of the NAT's translation scheme depends upon the fact that the computing device behind the NAT, here device 100, sends the initial message to initiate communications. FIG. 1*d*, again from the prior art, shows what happens when, instead, the computing device 112 attempts to initiate communications with device 100. Because the private network address 106 of device 100 is invalid in the public address space of the Internet 110, device 112 addresses its initial message to the public address 108 of NAT 104. This initial message follows the path 120. Just as when the NAT received the response message in the scenario of FIG. 1*b*, the NAT looks for an address translation mapping in its table 118. However, in the scenario of FIG. 1*d* the mapping shown in FIG. 1*c* does not exist because device 100 never sent a message through the NAT to device 112. Without the mapping, the NAT cannot translate the "to address" field in the message's header to a private network address on LAN 102. The message is discarded. Thus, in the prior art, a computing device outside of a NAT cannot initiate communications directly with a device behind the NAT. The problem is exacerbated when each computing device is behind its own NAT: then neither device can initiate communications with the other.

Figure 2:
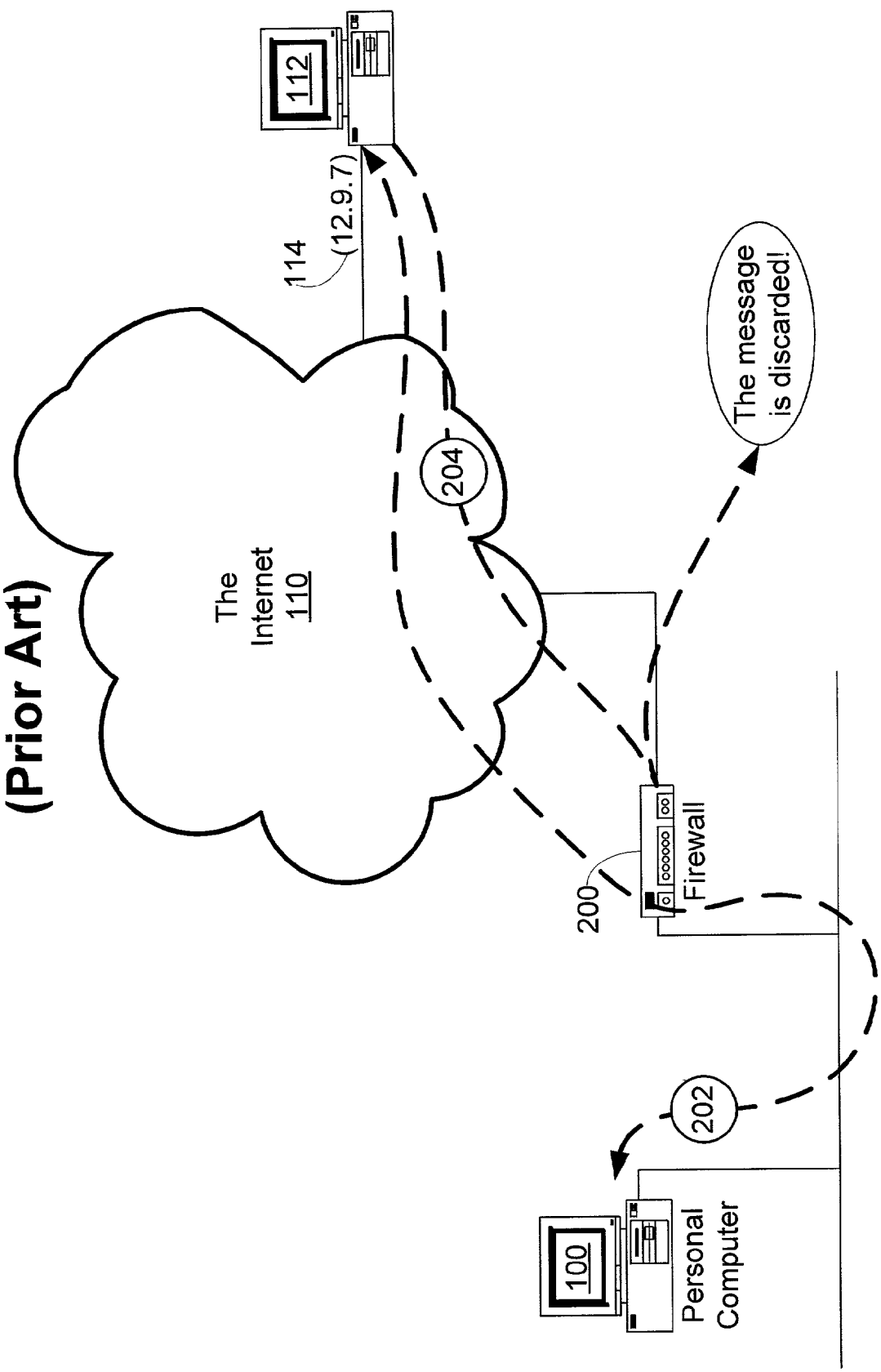
FIG. 2 is a network flow diagram from the prior art showing how a firewall blocks communications on addresses and ports not specifically allowed.

FIG. 2 portrays another common communications blocker. The NAT 104 of FIG. 1*a* is replaced by a firewall 200. For purposes of the present discussion, a firewall may be thought of as blocking all communications, based on their addresses and port numbers, that have not been specifically allowed. For example, assume that the firewall is set up to allow communications between the computing device 100 and all devices, such as device 112, in the public address space of the Internet 110. However, the firewall only allows traffic directed to ports 80 and 443. In the Figure, device 100 sends communications 202 directed to port 80, address (12.9.7), the public address of device 112. The firewall passes these communications unaltered. If device 112 were to attempt to communicate with device 100 on port 1234, as in communications flow 204, however, the firewall would prevent the communications from reaching device 100. Firewalls present problems for real-time, peer-to-peer applications because, although a port can almost always be found that is open for communications through the firewall (e.g., port 80 is usually open), that port may be handling so much traffic from other sources that real-time response requirements cannot be met.

The similarity in the icons for NAT 104 introduced in FIG. 1*a* and the firewall 200 of FIG. 2 is suggestive: these two services are often provided by the same piece of hardware. In some cases, that hardware may be part of computing device 100.

II. An Exemplary Computing Environment

Figure 3:
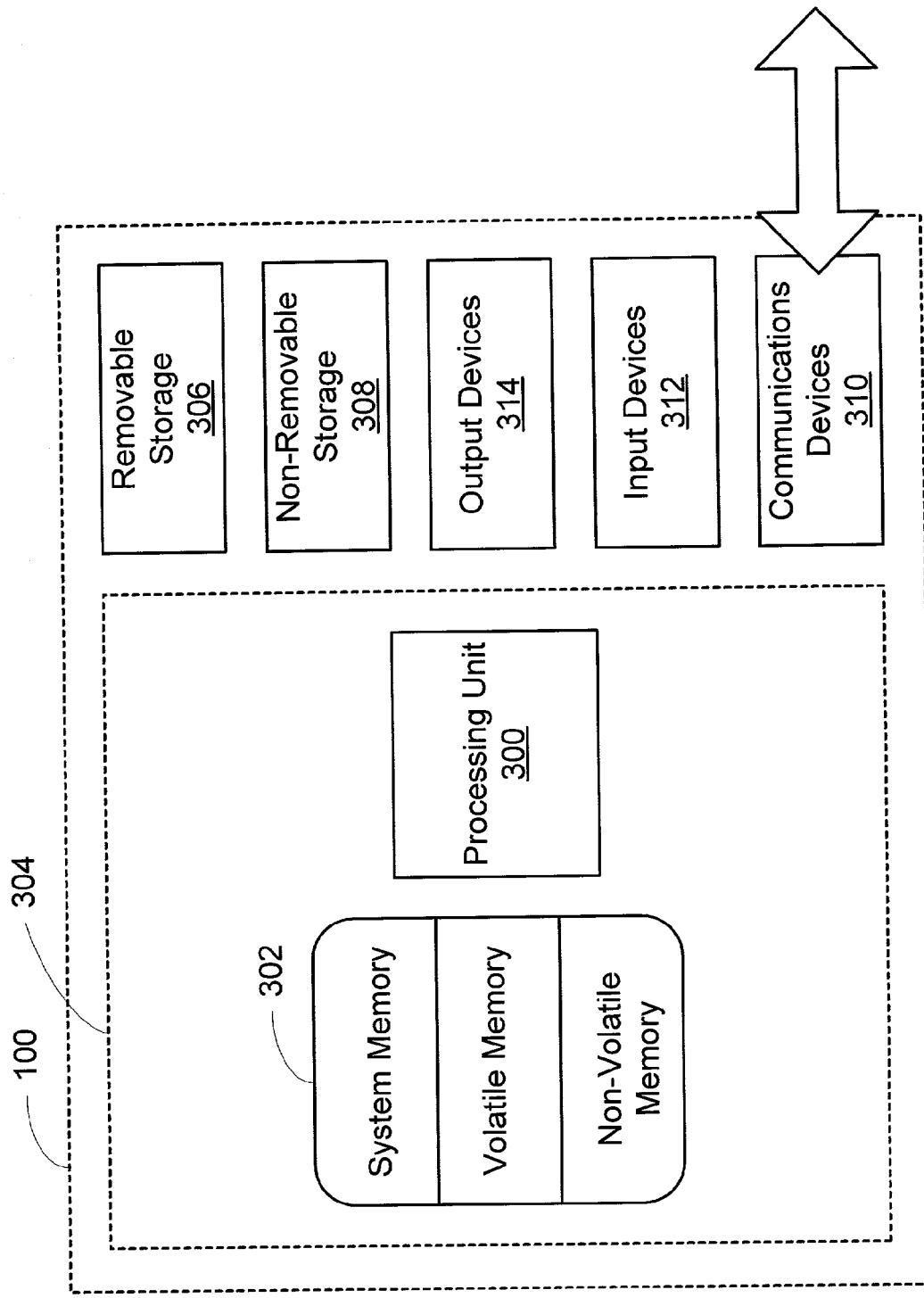
FIG. 3 is a block diagram generally illustrating an exemplary computer system that supports the present invention.

The computing devices 100 and 112 of FIG. 1*a* may be of any architecture. FIG. 3 is a block diagram generally illustrating an exemplary computer system that supports the present invention. Computing device 100 is only one example of a suitable environment and is not intended to suggest any limitation as to the scope of use or functionality of the invention. Neither should computing device 100 be interpreted as having any dependency or requirement relating to any one or combination of components illustrated in FIG. 3. The invention is operational with numerous other general-purpose or special-purpose computing environments or configurations. Examples of well-known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, computing device 100 typically includes at least one processing unit 300 and memory 302. The memory 302 may be volatile (such as RAM), non-volatile (such as ROM, flash memory, etc.), or some combination of the two. This most basic configuration is illustrated in FIG. 3 by the dashed line 304. The computing device may have additional features and functionality. For example, computing device 100 may include additional storage (removable and non-removable) including, but not limited to, magnetic and optical disks and tape. Such additional storage is illustrated in FIG. 3 by removable storage 306 and non-removable storage 308. Computer-storage media include volatile and non-volatile, removable and non-removable, media implemented in any method or technology for storage of information such as computer-readable instructions, data structures, program modules, or other data. Memory 302, removable storage 306, and non-removable storage 308 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media that can be used to store the desired information and that can be accessed by device 100. Any such computer-storage media may be part of device 100. Device 100 may also contain communications connections 310 that allow the device to communicate with other devices. Communications connections 310 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks (including LAN 102 of FIG. 1a) and direct-wired connections, and wireless media such as acoustic, RF, infrared, and other wireless media. The term "computer-readable media" as used herein includes both storage media and communications media. Computing device 100 may also have input devices 312 such as a keyboard, mouse, pen, voice-input device, touch-input device, etc. Output devices 314 such as a display, speakers, printer, etc., may also be included. All these devices are well know in the art and need not be discussed at length here.

Figure 4A:
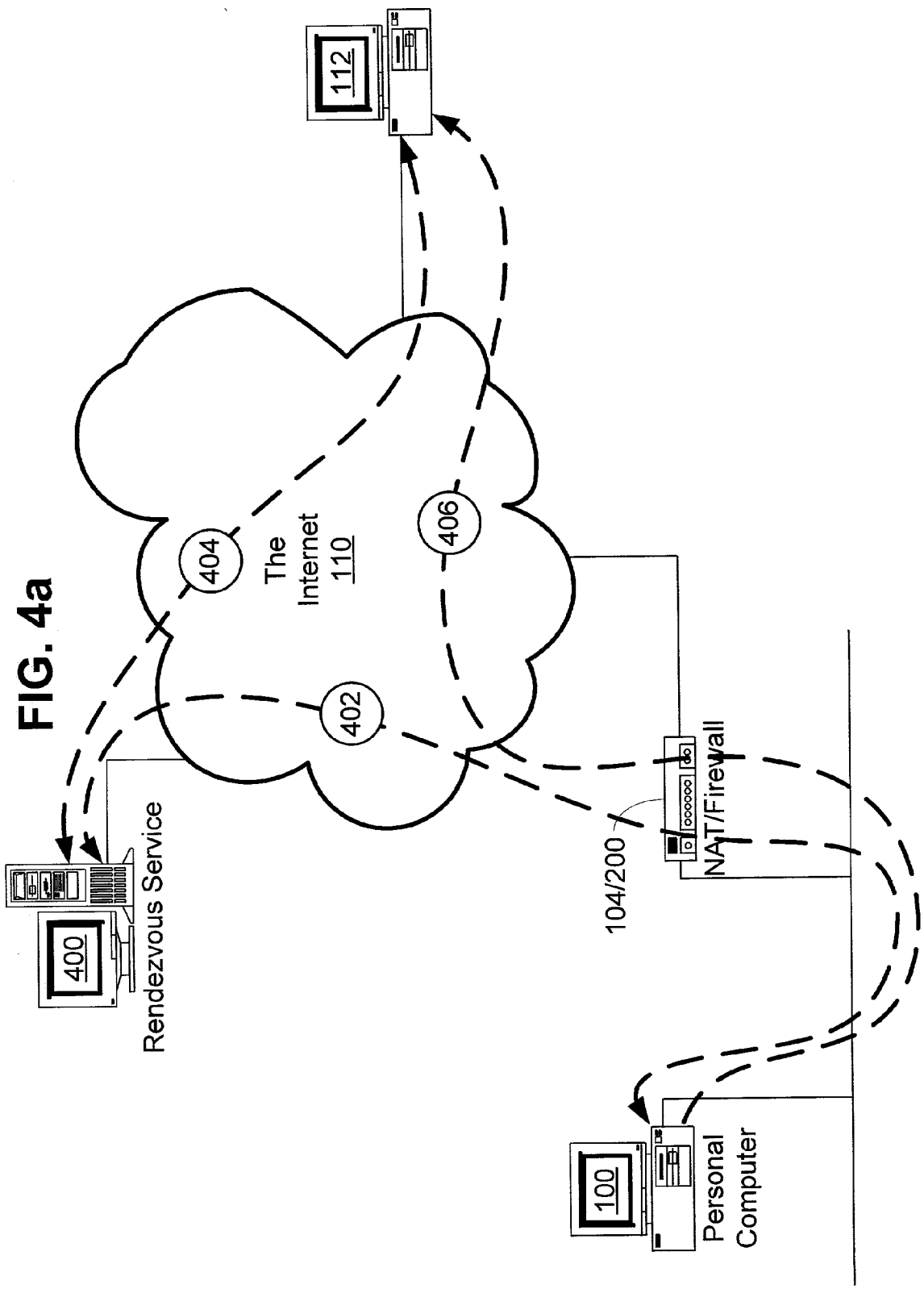
Figure 4C:
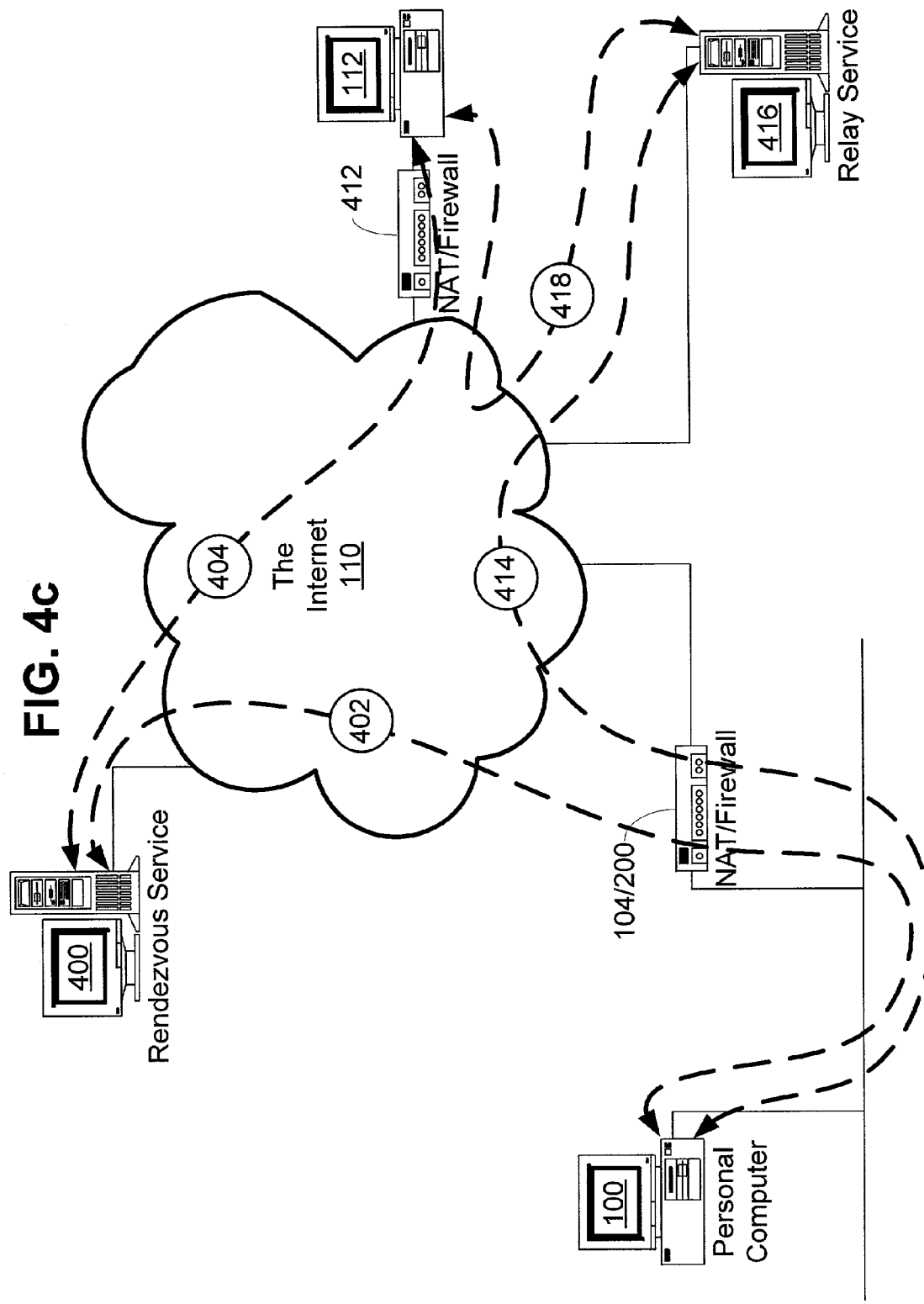
Figure 5A:
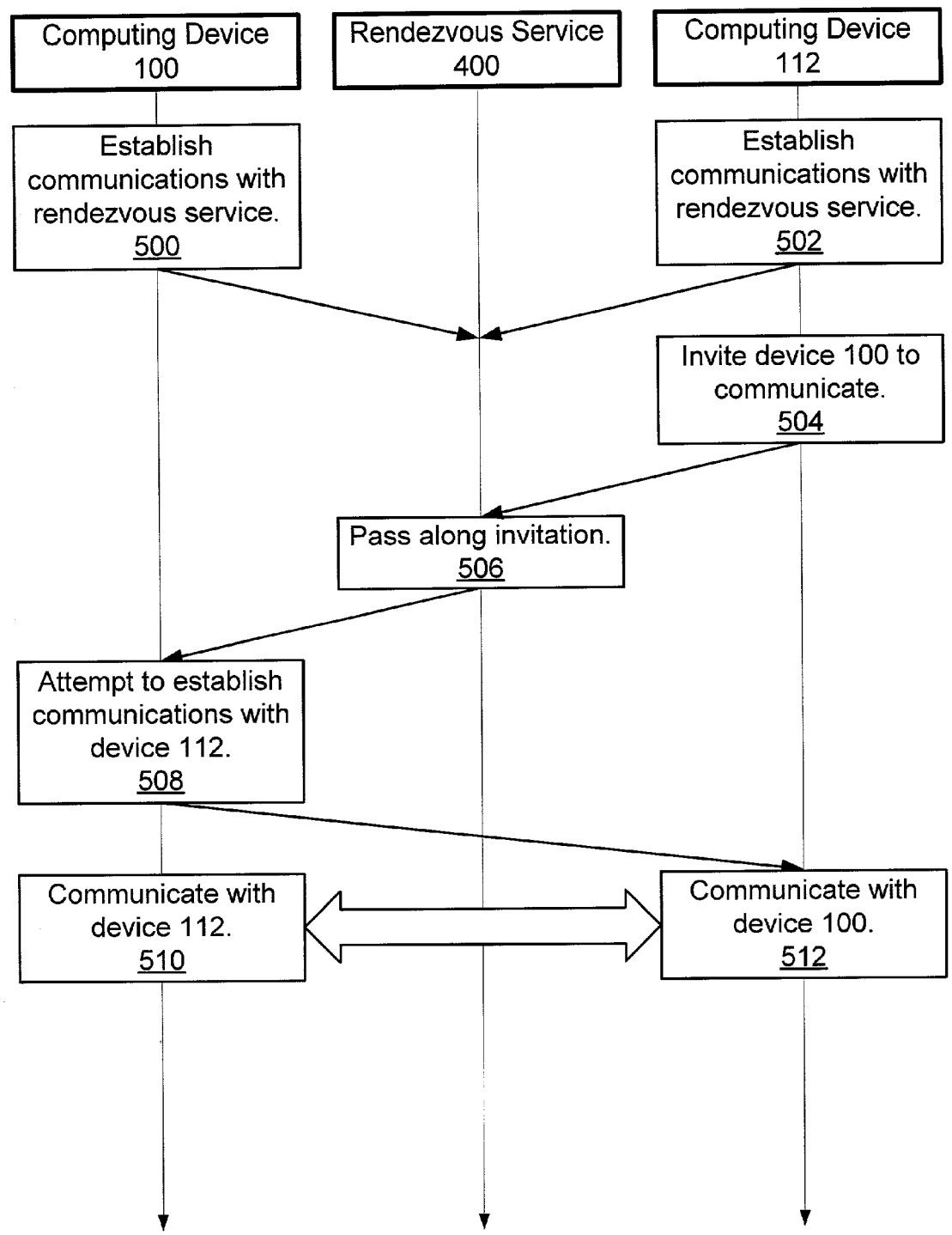
FIGS. 5a, 5b, and 5c are combination flow charts and data flow diagrams of exemplary methods usable by the computing devices and rendezvous service in the scenarios of FIGS. 4a, 4b, and 4c, respectively.
Figure 5B:
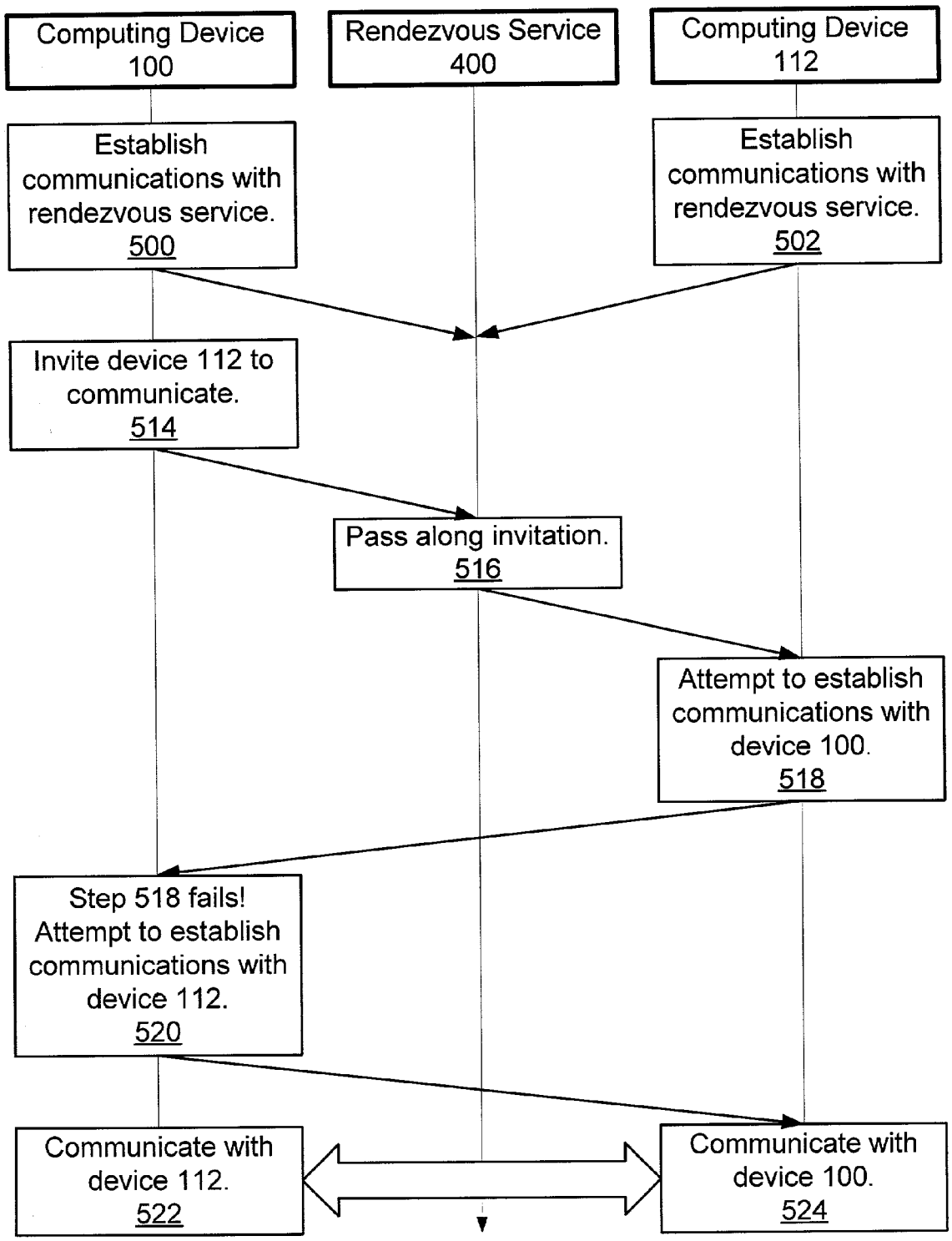
Figure 5C:
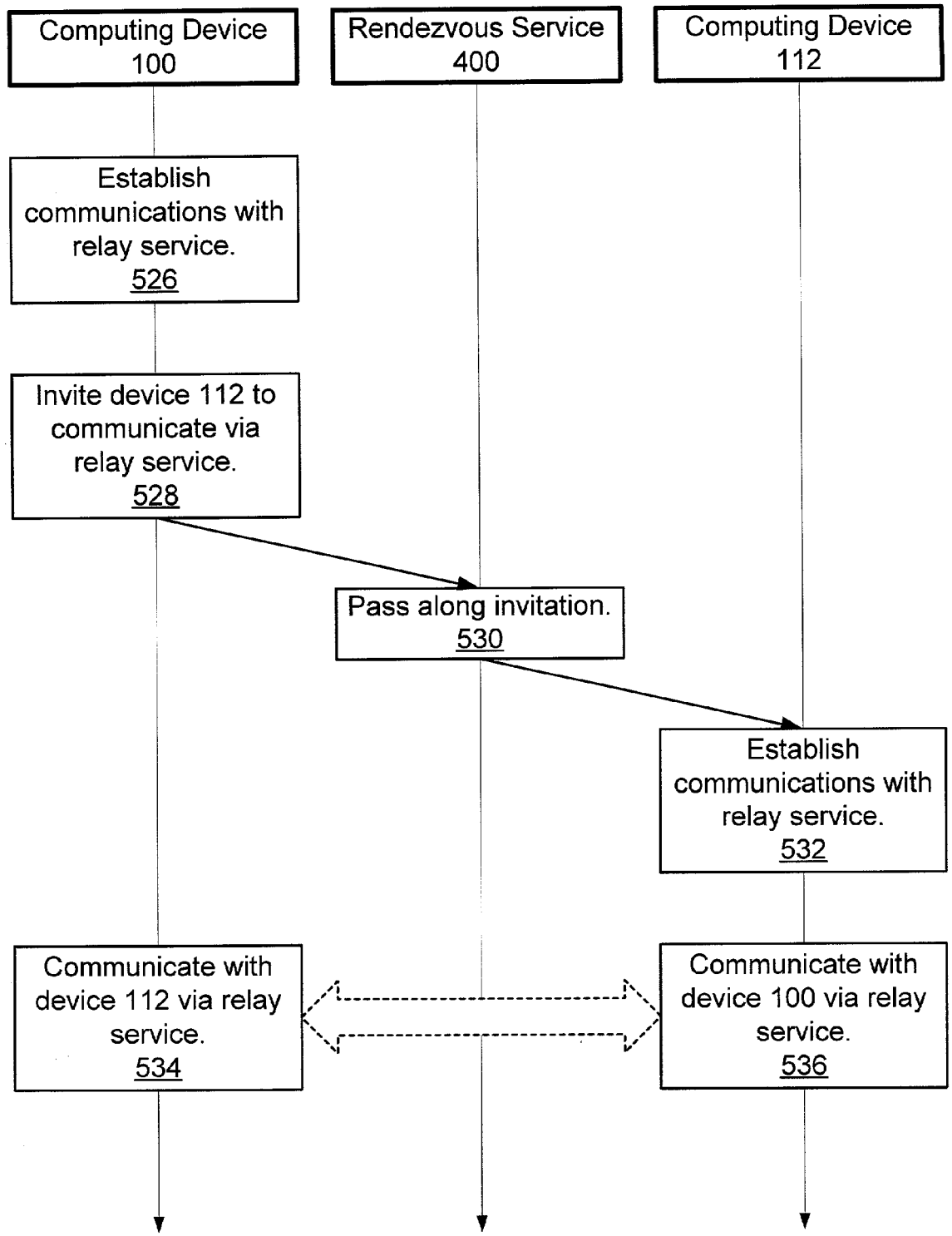

III. The Invention in Operation: NATs, Firewalls, and Rendezvous and Relay Services FIGS. 4a, 4b, and 4c present example scenarios in which two computing devices, 100 and 112, attempt to establish direct, peer-to-peer communications with each other. FIGS. 5a, 5b, and 5c, respectively, illustrate exemplary methods that the devices may use in these scenarios. In an attempt to forestall the connection problems illustrated in FIGS. 1d and 2, a rendezvous service 400 is provided. Computing devices can freely establish communications with the rendezvous service, typically by logging on to it. The devices can then discover other devices with which they wish to communicate and can send connection information to other devices by way of the service. This is made clearer by the examples described below. MICROSOFT'S "MSN MESSENGER" is an example of a rendezvous service.

Note that in the examples of FIGS. 4a, 4b, and 4c, the communications blocker in front of computing device 100 is labeled "NAT/Firewall": this represents any type of communications blocker, be it a NAT, a firewall, a combination of the two, or something else entirely. The particulars of the blocker's operation are not relevant to these examples.

In the first example, illustrated by FIGS. 4a and 5a, computing devices 100 and 112 establish communications flows, 402 and 404, respectively, with the rendezvous service 400. While the corresponding steps, 500 and 502, of FIG. 5a are shown as occurring simultaneously, that need not be the case. Possibly using a discovery or naming service provided by the rendezvous service, device 112 decides to communicate with device 100. In step 504, device 112 invites device 100 to establish communications. The invitation is sent to the rendezvous service rather than directly to device 100. In step 506, the rendezvous service attempts (after possible translations not relevant to the present discussion) to pass the invitation along to device 100. Even though device 100 is behind the communications blocker 104/200, the already established communications flow 402 allows the invitation to reach device 100. Upon receiving the invitation, device 100 in step 508 attempts to establish communications with device 112. Because there is no communications blocker in front of device 112, the attempt succeeds and devices 100 and 112 establish communications flow 406 with one another. In the parallel steps 510 and 512, devices 100 and 112 use communications flow 406 to communicate directly with one other. Note the importance of the directness of communications flow 406: it does not pass through the rendezvous service. That service is used only for signaling during establishment of the direct, peer-to-peer connection.

The example scenario of FIG. 4a is not symmetric because computing device 100 is behind a communications blocker 104/200 while device 112 is not. The second scenario of FIGS. 4b and 5b shows what may happen when, opposite to the example of FIGS. 4a and 5a, device 100 invites device 112 to establish communications. The procedure begins as before in steps 500 and 502 with the two devices establishing communications with rendezvous service 400. This time, device 100 sends, via the rendezvous service, an invitation to device 112 to establish communications (steps 514 and 516). When in step 518, device 112 attempts to establish communications flow 408, its attempt fails because of the communications blocker 104/200 in front of device 100. (Note that the presence of a communications blocker need not doom this attempt to fail. The blocker may allow the communications in which case this attempt successfully establishes the communications flow as in the previous scenario. The procedures of FIG. 5b only proceeds if step 518 fails.) Device 100 becomes aware of device 112's failure. That awareness may arise when the rendezvous service uses communications flow 402 to pass on a failure message sent to it from device 112. Alternately, device 100 may time how long it takes device 112 to establish communications. If the timer goes off before communications are established, device 100 decides that device 112 failed. In any case, device 100 now attempts, in step 520, to establish communications flow 410 with device 112. Just as in the scenario of FIGS. 4a and 5a, this attempt succeeds because there is no communications blocker in front of device 112. In the parallel steps 522 and 524, devices 100 and 112 use communications flow 410 to communicate directly with one other.

Comparing the two scenarios presented so far, one may be tempted to think that the procedure of FIG. 5*b* is extraneous because devices would simply choose to use the procedure of FIG. 5*a* and have the device behind the communications blocker always be the one to attempt to establish the communications. The situation is not so straightforward, however, because a device cannot always know whether or not it is behind a communications blocker. The invention is designed to work regardless of whether either or both devices are behind blockers.

In the third example scenario of FIGS. 4*c* and 5*c*, a communications blocker 412 sits in front of computing device 112. It is clear that because a blocker sits in front of each device, neither device may be able to establish direct, peer-to-peer communications, that is, the procedures of both FIGS. 5*a* and 5*b* may fail. In this case, the devices settle for a second best solution. In step 526, presumably after attempting the procedures of FIGS. 5*a* and 5*b*, one of the two devices (shown as device 100 but that is not significant) establishes communications flow 414 with a relay service 416. The relay service is designed just for such situations: it accepts communications from each device and passes them on to the other. It is optimized for low delay and high throughput. The relay service sends to device 100 a session identifier. In step 528, device 100 invites, via the rendezvous service 400, device 112 to use the relay service to communicate with it. The invitation includes the session identifier. Device 112 establishes, in step 532, communications flow 418 with the relay service and gives the relay service the session identifier. With this, the relay service knows to pass communications between devices 100 and 112. In the parallel steps 534 and 536, devices 100 and 112 use their communications flows 414 and 418, respectively, to the relay service to communicate with one other. The arrow between these two steps has a dashed outline to indicate that the communications are indirect, being mediated by the relay service.

In sum, by proceeding through the procedures of FIGS. 5*a* and 5*b*, two computing devices can use a rendezvous service to establish direct, peer-to-peer communications even if either one of the two devices sits behind a communications blocker. If communications blockers prevent both devices from establishing direct communications with the other, then the devices can use a relay service to communicate indirectly with each other, providing the illusion of direct communications.

Figure 6:
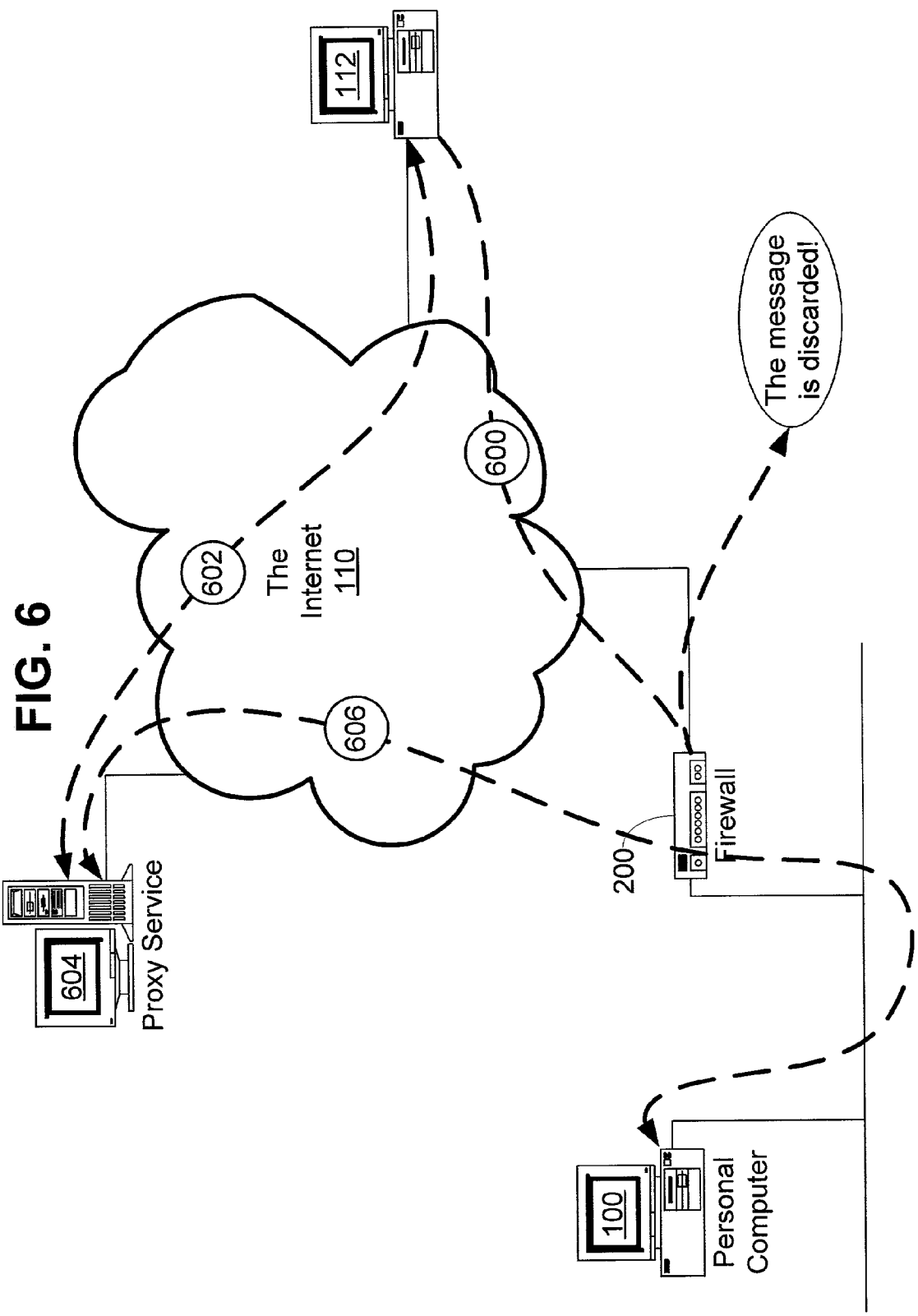
FIG. 6 is a network flow diagram of a scenario in which a computing device attempts to establish communications with its peer device in the presence of a firewall.
Figure 7A:
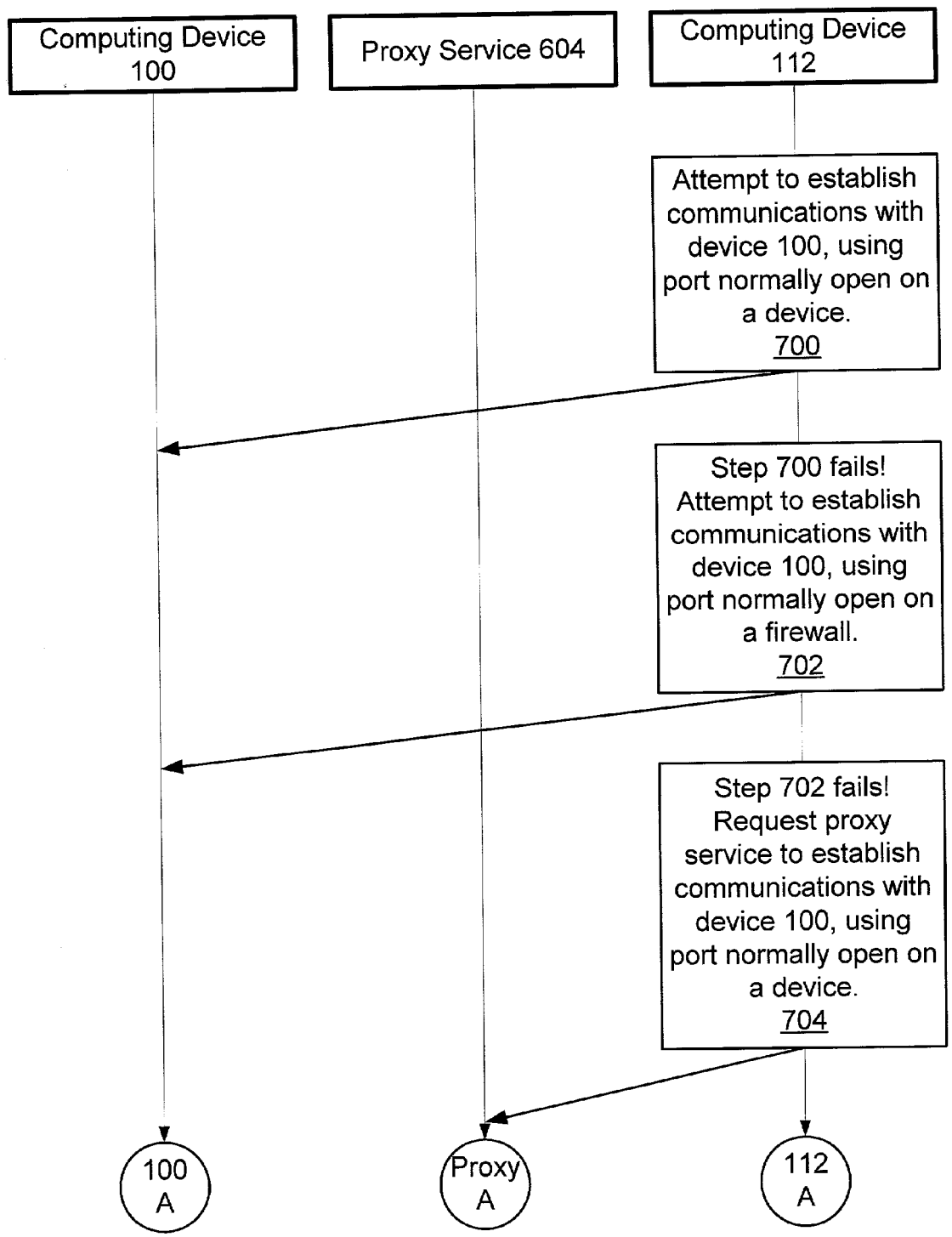
Figure 7B:
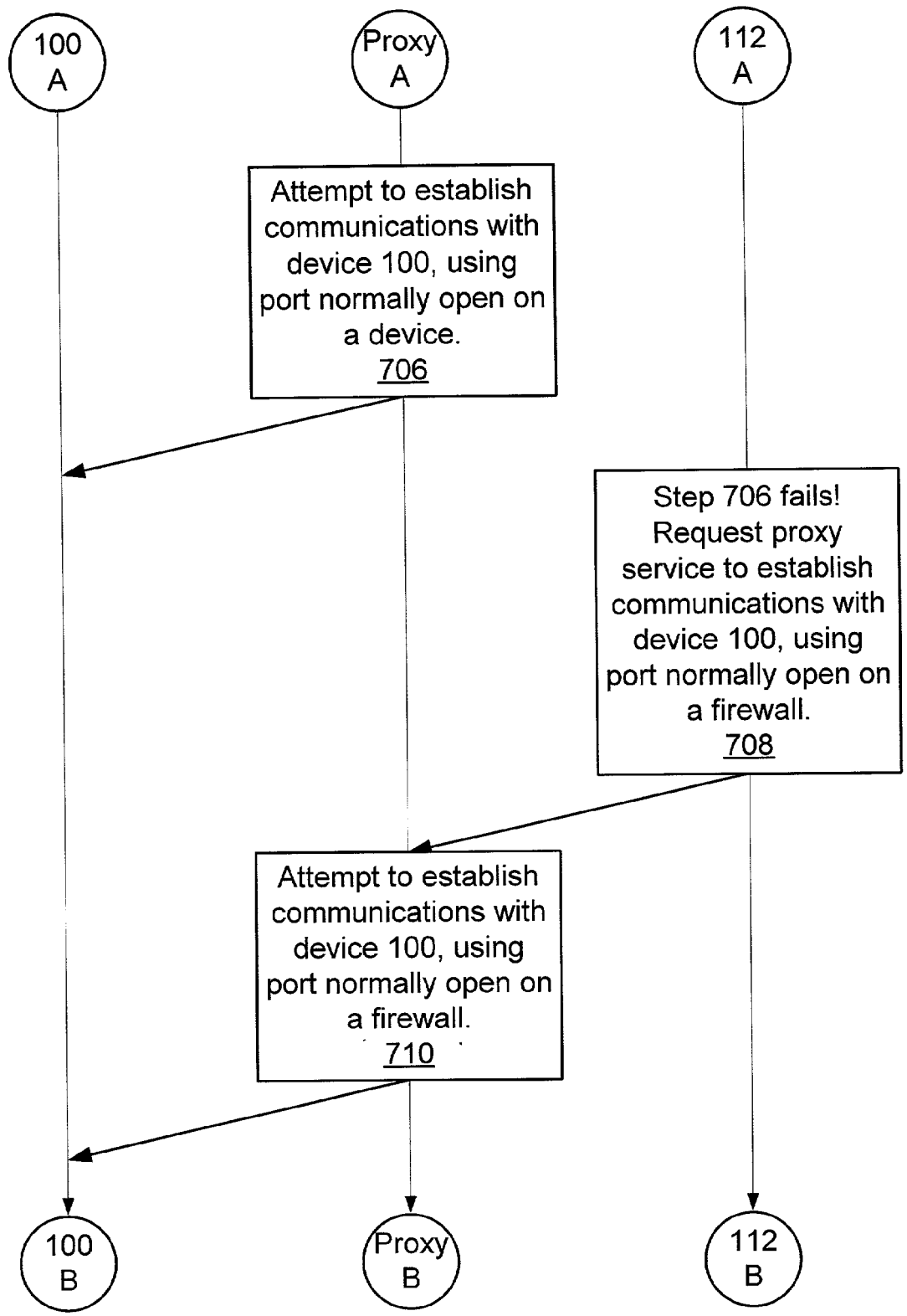

FIG. 6 presents a scenario of communications blocking specific to firewalls. As discussed with reference to FIG. 2, a firewall may be configured to block all communications, based on their addresses and port numbers, that have not been specifically allowed. Computing device 112 attempts to establish communications flow 600 through firewall 200 to device 100, but the firewall is not configured to accept the port number that device 112 is using and so discards the message. FIGS. 7*a*, 7*b*, and 7*c* portray a method that device 112 can use to establish communications in spite of the blocking firewall. In step 700, device 112 attempts to establish communications flow 600 as it normally would, addressing the flow to device 100 and using a port usually open to communications. For example, port 80 is often open. If the attempt succeeds, then devices 100 and 112 can communicate directly with one another. Else, device 112 move to step 702 and again attempts to establish communications flow 600. This time, however, device 112 uses a different port number, perhaps one often open on firewalls. Some firewalls open port 443 for encrypted communications, but will allow anything to pass through. If this attempt succeeds, the procedure is complete. Otherwise, device 112 proceeds to step 704 in which it establishes communications flow 602 with a proxy service 604. The proxy may have privileges beyond those of device 112 and may be able to establish communications flow 606 with device 100. In so doing, the proxy may use the port originally attempted by device 112 (e.g., port 80), may use port 443, or may negotiate with the firewall to use another port. This is reflected in steps 706, 708, and 710 of FIG. 7*b*. If the proxy succeeds, then as shown in parallel steps 712 and 714, devices 112 and 100 can communicate with each other through the proxy. There is nothing special about the order of steps 700, 702, 704, and 708: device 112 may attempt these steps in any order. Note that this procedure may be used whenever device 112 is having difficulty establishing direct communications with device 100. In particular, it may be useful in conjunction with the procedures of FIGS. 5*a*, 5*b*, and 5*c*.

The methods of FIGS. 5*a*, 5*b*, 5*c*, 7*a*, 7*b*, and 7*c* may be implemented in any number of ways. They may be incorporated into network communications drivers running on the computing devices 100 and 112. That way, the procedures become transparent to users of and applications running on the devices. In many cases, users and applications need not know whether they are using direct, peer-to-peer communications or a relay service, the originally chosen port number, another port number, or a proxy service. Of course, this information can be provided to users and application if desired.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method for a first computing device to establish communications with a second computing device, the method comprising:

sending a first communications request addressed to a rendezvous service, the first communications request specifying the second computing device;

waiting to receive communications from the second computing device;

waiting for a first failure indication, indicating that the second computing device failed to establish communications with the first computing device;

if the first failure indication occurs before communications from the second computing device are received, then sending communications addressed to the second computing device;

waiting for a second failure indication, indicating that the communications addressed to the second computing device failed to establish communications with the second computing device; and if the second failure indication occurs before communications from the second computing device are received, then establishing communications with a relay service and sending a second communications request addressed to the rendezvous service, the second communications request specifying the relay service.

2. The method of claim 1 wherein specifying the second computing device comprises specifying an element in the set: a name of the second computing device, a public address of the second computing device, a public address of a Network Address Translator (NAT) behind which sits the second computing device.

3. The method of claim 1 wherein the first failure indication is in the set: an event associated with a timer associated with sending the first communications request addressed to the rendezvous service, reception of communications from the rendezvous service.

4. The method of claim 1 wherein the second failure indication is an event associated with a timer associated with sending the communications addressed to the second computing device.

5. The method of claim 1 wherein sending the second communications request addressed to the rendezvous service comprises sending an indication that the first computing device failed to establish communications with the second communications device.

6. The method of claim 1 wherein specifying the relay service comprises specifying an element in the set: a name of the relay service, a public address of the relay service.

7. The method of claim 1 wherein the second communications request further specifies an identifier of a session on the relay service.

8. The method of claim 1 embodied in computer-executable instructions on computer-readable media.

9. A method for a second computing device to establish communications with a first computing device, the method comprising:
receiving a first communications request from a rendezvous service, the first communications request specifying the first computing device;
sending communications addressed to the first computing device;
waiting to receive communications from the first computing device;
waiting for a first failure indication, indicating that the second computing device failed to establish communications with the first computing device;
if the first failure indication occurs before communications from the first computing device are received, then sending communications addressed to the rendezvous service;
receiving a second communications request from the rendezvous service, the second communications request specifying a relay service; and
establishing communications with the relay service.

10. The method of claim 9 wherein specifying the first computing device comprises specifying an element in the set: a name of the first computing device, a public address of the first computing device, a public address of a Network Address Translator (NAT) behind which sits the first computing device.

11. The method of claim 9 wherein the first failure indication is an event associated with a timer associated with sending the communications addressed to the first computing device.

12. The method of claim 9 wherein sending communications addressed to the rendezvous service comprises sending an indication that the second computing device failed to establish communications with the first computing device.

13. The method of claim 9 wherein specifying the relay service comprises specifying an element in the set: a name of the relay service, a public address of the relay service.

14. The method of claim 9 wherein the second communications request further specifies an identifier of a session on the relay service.

15. The method of claim 9 embodied in computer-executable instructions on computer-readable media.

16. A method for a first computing device to establish communications with a second computing device, the method comprising:
sending a first communications addressed to the second computing device, using an address and a first port number associated with the second computing device;
waiting to receive communications from the second computing device;
waiting for a first failure indication, indicating that the first communications failed to establish communications with the second computing device;
if the first failure indication occurs before communications from the second computing device are received, then sending a second communications addressed to the second computing device, using the address associated with the second computing device and a second port number;
waiting for a second failure indication, indicating that the second communications failed to establish communications with the second computing device; and
if the second failure indication occurs before communications from the second computing device are received, then sending a first communications request to a proxy, requesting a proxy connection to the second computing device using the address and the first port number associated with the second computing device;
waiting for a third failure indication, indicating that the first communications request to the proxy failed to establish communications with the second computing device; and
if the third failure indication occurs before communications from the second computing device are received, then sending a second communications request to the proxy, requesting a proxy connection to the second computing device using the address associated with the second computing device and the second port number.

17. The method of claim 16 wherein the first failure indication is an event associated with a timer associated with sending the first communications addressed to the second computing device.

18. The method of claim 16 wherein the second port number is a port number associated with sending encrypted communications to a firewall.

19. The method of claim 16 wherein the second port number is 443 or 80.

20. The method of claim 16 wherein the second failure indication is an event associated with a timer associated with sending the second communications addressed to the second computing device.

21. The method of claim 16 wherein the third failure indication is in the set: an event associated with a timer associated with sending the first communications request to the proxy; reception of communications from the proxy.

22. The method of claim 16 wherein the second port number is a port number associated with sending encrypted communications to a firewall.

23. The method of claim 16 wherein the second port number is 443 or 80.

24. The method of claim 16 embodied in computer-executable instructions on computer-readable media.

25. A method for a first computing device to establish communications with a second computing device, the method comprising:
- sending a first communications addressed to the second computing device, using an address and a first port number associated with the second computing device;
- waiting to receive communications from the second computing device;
- waiting for a first failure indication, indicating that the first communications failed to establish communications with the second computing device;
- if the first failure indication occurs before communications from the second computing device are received, then sending a first communications request to a proxy, requesting a proxy connection to the second computing device using the address and the first port number associated with the second computing device;
- waiting for a second failure indication, indicating that the first communications request to the proxy failed to establish communications with the second computing device; and
- if the second failure indication occurs before communications from the second computing device are received, then sending a second communications addressed to the second computing device, using the address associated with the second computing device and the second port number.

26. The method of claim 25 wherein the first failure indication is an event associated with a timer associated with sending the first communications addressed to the second computing device.

27. The method of claim 25 wherein the second failure indication is in the set: an event associated with a timer associated with sending the first communications request to the proxy; reception of communications from the proxy.

28. The method of claim 25 wherein the first port number is a port number associated with sending encrypted communications to a firewall.

29. The method of claim 25 wherein the first port number is 443 or 80.

30. The method of claim 25 further comprising:
- waiting for a third failure indication, indicating that the second communications failed to establish communications with the second computing device; and
- if the third failure indication occurs before communications from the second computing device are received, then sending a second communications request to the proxy, requesting a proxy connection to the second computing device using the address associated with the second computing device and the second port number.

31. The method of claim 30 wherein the third failure indication is an event associated with a timer associated with sending the second communications addressed to the second computing device.

32. The method of claim 30 wherein the second port number is a port number associated with sending encrypted communications to a firewall.

33. The method of claim 25 wherein the second port number is 443 or 80.

34. The method of claim 25 embodied in computer-executable instructions on computer-readable media.

* * * * *